US009780665B2

(12) United States Patent
Li et al.

(10) Patent No.: US 9,780,665 B2
(45) Date of Patent: Oct. 3, 2017

(54) METHODS AND SYSTEMS FOR CONTROLLING A BOOST CONVERTER

(75) Inventors: Lihua Li, Irvine, CA (US); Seok-Joo Jang, Irvine, CA (US); Ray M Ransom, Big Bear City, CA (US); Constantin C. Stancu, Torrance, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1383 days.

(21) Appl. No.: 13/421,001

(22) Filed: Mar. 15, 2012

(65) Prior Publication Data
US 2013/0241519 A1   Sep. 19, 2013

(51) Int. Cl.
*H02M 3/156* (2006.01)
*H02M 3/158* (2006.01)

(52) U.S. Cl.
CPC .. *H02M 3/1584* (2013.01); *H02M 2003/1586* (2013.01)

(58) Field of Classification Search
CPC .. H02M 3/158; H02M 3/1584; Y02B 70/1466
USPC .......................... 323/225, 268, 271, 272, 350
See application file for complete search history.

(56) References Cited

U.S. PATENT DOCUMENTS

| 6,433,527 | B1 | 8/2002 | Izadinia et al. | |
|---|---|---|---|---|
| 6,563,294 | B2* | 5/2003 | Duffy | H02J 1/102 323/283 |
| 7,414,383 | B2* | 8/2008 | Burton et al. | 323/271 |
| 7,923,974 | B2 | 4/2011 | Martin et al. | |
| 8,085,015 | B2* | 12/2011 | Lee | 323/272 |
| 8,319,484 | B2* | 11/2012 | Houston | 323/272 |
| 8,344,712 | B2* | 1/2013 | Martin et al. | 323/272 |
| 8,519,685 | B2* | 8/2013 | Chatroux et al. | 323/272 |
| 8,570,010 | B2* | 10/2013 | Lin | H02M 3/1584 323/272 |
| 8,587,272 | B2* | 11/2013 | Gu | H02M 3/1584 323/272 |
| 2004/0046535 | A1 | 3/2004 | Duffy et al. | |
| 2008/0129259 | A1* | 6/2008 | Endo et al. | 323/271 |

(Continued)

FOREIGN PATENT DOCUMENTS

| CN | 1967989 | 5/2007 |
|---|---|---|
| CN | 102804575 | 11/2012 |

(Continued)

OTHER PUBLICATIONS

State Intellectual Property Office of the Peoples' Republic of China, Office Action in Chinese Patent Application No. 201310082909.1, mailed Nov. 24, 2014.

*Primary Examiner* — Gary L Laxton
(74) *Attorney, Agent, or Firm* — Lorenz & Kopf, LLP

(57) ABSTRACT

Methods and systems are provided for control operation of a boost converter. The boost converter includes an input, an output, and a plurality of paths electrically connecting the input to the output. The boost converter also includes a plurality of switches disposed along the paths to control current flow between the input and the output. The system includes a controller. The controller receives a desired current to be supplied at the output. The controller determines which of the paths to utilize based at least in part on the desired current. The controller controls the switches based at least in part on the determination of which of the paths to utilize.

20 Claims, 5 Drawing Sheets

(56) References Cited

U.S. PATENT DOCUMENTS

2011/0080151 A1    4/2011   Rahardjo et al.
2012/0098507 A1*   4/2012   Hasegawa et al. ........... 323/271

FOREIGN PATENT DOCUMENTS

| DE | 102008016532 A1 | 11/2008 |
|----|-----------------|---------|
| JP | 2006311776 A    | 11/2006 |
| WO | 2010150338 A1   | 12/2010 |

\* cited by examiner

METHODS AND SYSTEMS FOR CONTROLLING A BOOST CONVERTER

TECHNICAL FIELD

The technical field generally relates to operation and control of boost converters, and more particularly relates to operation and control of direct current (DC) boost converters for a vehicle.

BACKGROUND OF THE INVENTION

Electric, hybrid electric, and fuel cell vehicles typically utilize a high voltage power distribution system to deliver high voltage DC power to an electric drive motor and other electrical devices. The high voltage necessary for a vehicular drive motor is often on the order of 300-500 V. In order to achieve these necessary high voltages, power distribution systems may implement a boost converter, also commonly referred to as a step-up converter. Such a boost converter permits the batteries and/or power sources, e.g. a fuel cell, to store and deliver lower voltages than would be required without a boost converter.

However, typical operation of vehicle boost converters is often inefficient. Moreover, when coupled to a fuel cell, the boost converter may cause stress to an upper-level stack of the fuel cell, due to current ripple. Furthermore, electrical and electronic components of the boost converter may rapidly wear out due to unnecessary overuse.

Accordingly, it is desirable to provide a system and method for achieving high efficiency operation of a boost converter. In addition, it is desirable to provide a system and method of operating a boost converter that will reduce stress on connected components, such as a fuel cell. It is also desirable to increase component life of a boost converter. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for controlling operation of a boost converter using a controller. The boost converter includes an input, an output, and a plurality of paths electrically connecting the input to the output. The boost converter also includes a plurality of switches disposed along the paths to control current flow between the input and the output. The method comprises receiving a desired current at the controller. The method further comprises determining which of the paths to utilize based at least in part on the desired current. The method also comprises controlling the switches with the controller based at least in part on the determination of which of the paths to utilize.

A system is also provided. The system includes a boost converter. The boost converter includes an input, an output, and a plurality of paths electrically connecting the input to said output. The boost converter further includes a plurality of switches disposed along the paths to control current flow between the input and the output. The system includes a controller for receiving a desired current, determining which of the paths to utilize based at least in part on the desired current, and controlling the switches based at least in part on the determination of which of the paths to utilize.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Referring to the figures, wherein like numerals indicate like parts throughout the several views, a power distribution system 100 for a vehicle 102 and method for controlling a power distribution system 100 is shown and/or described herein.

Figure 1:
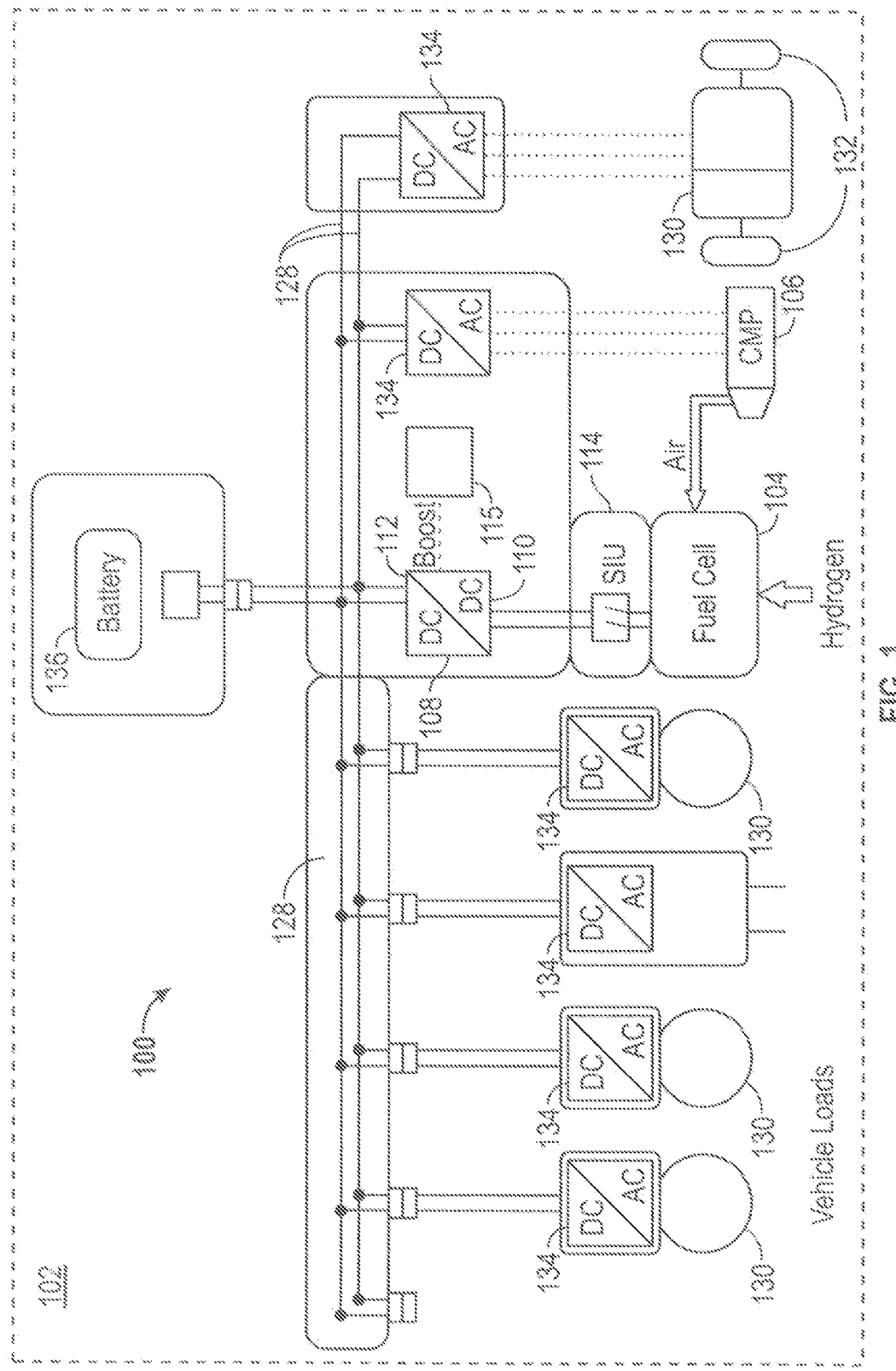
FIG. 1 is a block diagram of one embodiment of a power distribution system for a vehicle showing a boost converter operatively connecting a power source to a high voltage bus.

With reference to FIG. 1, the system 100 includes a power source 104 for generating electrical power. In the illustrated embodiment, the power source 104 is implemented as a fuel cell (not separately numbered) for generating the electrical power from a fuel, e.g., hydrogen. (However, the fuel cell may be fueled by other fuels besides hydrogen.) More specifically, the fuel cell of the illustrated embodiment comprises a plurality of fuel cell stacks connected in series. The system 100 of the illustrated embodiment also includes a compressor 106 to supply air to the fuel cell. The power source 104 of the illustrated embodiment produces electrical power having a direct current ("DC"). In other embodiments, the power source 104 may be implemented as an alternator (not shown) coupled to an internal combustion engine (not shown) as the power source 104. The alternator produces an alternating current ("AC") which may, or may not, be converted to DC depending on the particular embodiment implemented.

The system 100 also includes a boost converter 108 for boosting (i.e., raising) the voltage generated by the power source 104. The boost converter 108 may also be referred to as a step-up converter. The boost converter 108 includes at least one input 110 and at least one output 112. In the illustrated embodiment, a single input 110 and a single output 112 are utilized. In operation, a voltage at the output 112 is higher than a voltage at the input 110. In the illustrated fuel cell embodiment, a stack interface unit ("SIU") 114 operatively connects the fuel cell stacks of the power source 104 to the input 110 of the boost converter 108.

The system 100 includes a controller 115 in communication with the boost converter 108 for controlling operation of the boost converter 108. The controller 115 includes a memory (not shown) for storing data and processing logic (not shown) for executing instructions, e.g., a software program. The controller 115 may comprise a microprocessor, a microcontroller, an application specific integrated circuit, and/or other logic devices. Algorithms and techniques for controlling the boost converter 108 utilizing the controller 115 are discussed in further detail below.

Figure 2:
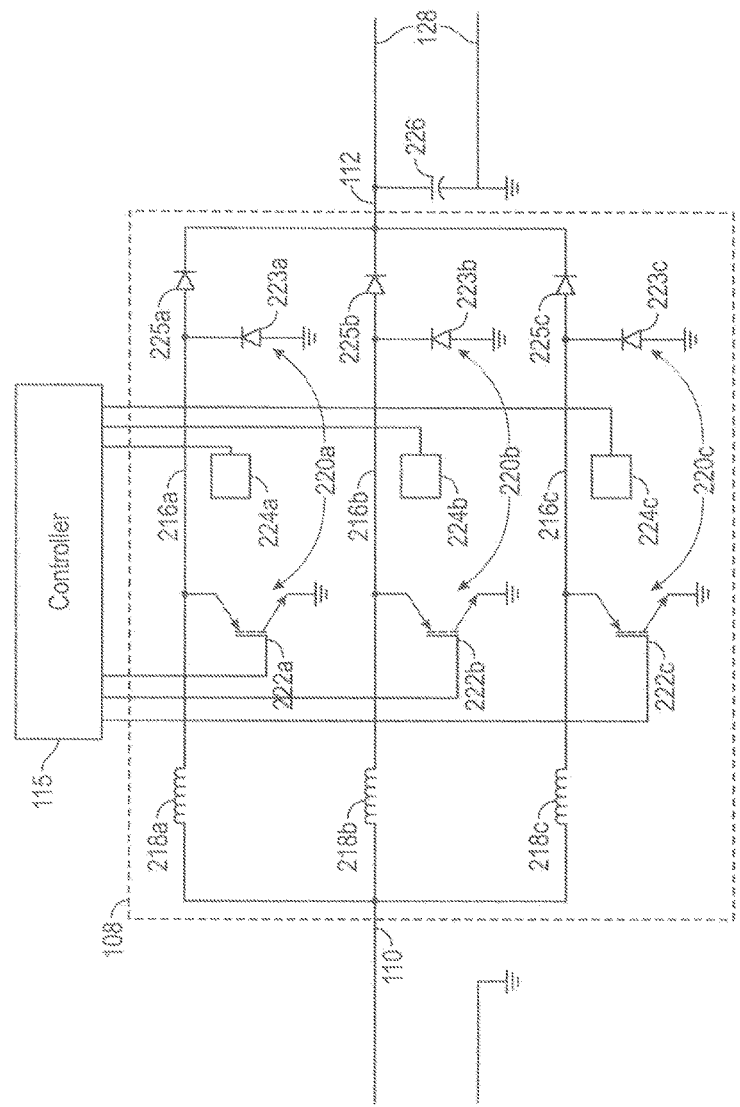
FIG. 2 is an electrical schematic diagram of the boost converter according to one embodiment having a plurality of electrical paths to conduct current therethrough.

Referring now to FIG. 2, the boost converter 108 of the illustrated embodiment includes a plurality of paths 216a, 216b, 216c electrically connecting the input 110 to the output 112. Specifically, the paths 216a, 216b, 216c of the illustrated embodiment are denoted as a first path 216a, a second path 216b, and a third path 216c, each extending from the input 110. In other embodiments, however, the boost converter 108 may utilize any number of power paths.

In the illustrated embodiment, each path 216a, 216b, 216c of the boost converter 108 includes an inductor 218a, 218b, 218c electrically connected to the input 110. As such, current flows through each inductor 218a, 218b, 218c and along each respective path 216a, 216b, 216c.

The boost converter 108 further includes a plurality of switches 220a, 220b, 220c. Each switch 220a, 220b, 220c is disposed along one of the paths 216a, 216b, 216c to control current flow between the input 110 and the output 112.

In the illustrated embodiment, each switch 220a, 220b, 220c is implemented with an insulated gate bipolar transistor ("IGBT") 222a, 222b, 222c and a diode 223a, 223b, 223c. Each IGBT 222a, 222b, 222c includes a gate, a collector, and an emitter (not numbered). Specifically, the collector of each IGBT 222a, 222b, 222c is electrically connected to one of the inductors 218a, 218b, 218c, each emitter is electrically connected to ground (or other reference potential, such as the vehicle chassis), and each gate is coupled to the controller 115. As such, the controller 115 may control operation (i.e., activation) of each IGBT 222a, 222b, 222c. The diodes 223a, 223b, 223c are disposed in parallel with the collector and emitters of the respective IGBTs 222a, 222b, 222c, as shown in FIG. 2.

The system 100 may include one or more temperature sensors 224a, 224b, 224c for sensing the temperatures of the inductors 218a, 218b, 218c, the switches 220a, 220b, 220c, the diodes 223a, 223b, 223c, and/or other electrical or electronic components. The temperature sensors 224a, 224b, 224c are in communication with the controller 115 to communicate temperature data to the controller 115. As such, the controller 115 may utilize temperature data in the process of controlling operation of the boost converter 108, as described in further detail below.

Specifically, in the illustrated embodiment, the temperature sensors 224a, 224b, 224c are thermistors, and more specifically, negative temperature coefficient ("NTC") thermistors. Although FIG. 2 only shows the temperature sensors 224a, 224b, 224c in proximity to the switches 220a, 220b, 220c, it is to be appreciated that additional temperature sensors may be implemented to sense the temperatures of the inductors 218a, 218b, 218c, diodes 223a, 223b, 223c, and/or other electrical or electronic components as stated above. Furthermore, other devices and techniques may be implemented to sense temperature, other than thermistors.

The boost converter 108 of the illustrated embodiment further includes a plurality of diodes 225a, 225b, 225c for rectifying the flow of current, i.e., acting as a passive switch, through the paths 216a, 216b, 216c as is shown in FIG. 2. Also, a capacitor 226 is electrically connected to output 112.

The system 100 of the illustrated embodiment further includes a distribution bus 128. The distribution bus 128 is electrically connected to the output 112 of the boost converter 108. The distribution bus 128 of the illustrated embodiment may also be referred to as a high voltage bus, reflecting the high voltage generated by the boost converter 108. The distribution bus 128 distributes electrical power to various loads 130 of the vehicle 102, including, but certainly not limited to, a drive motor (not separately numbered) for driving wheels 132 of the vehicle 102. The system 100 may include one or more DC-to-AC converters 134 electrically connected to distribution bus 128. The DC-to-AC converters 134 convert the DC power of the distribution bus 128 to AC power to be utilized by the AC loads 130.

The system 100 of the illustrated embodiment also includes a battery 136 for storing electricity. The battery 136 may comprise one or more electrical cells (not shown) as is well known in the art. The battery 136 is electrically connected to the distribution bus 128. As such, the battery 136 may be charged with power from the distribution bus 128, e.g., power generated by the power source 104. The battery 136 may also supply power to the distribution bus 128 and, accordingly, the loads 130.

The controller 115 may comprise a microprocessor, a microcontroller, an application specific integrated circuit ("ASIC"), and/or other logic device capable of performing calculations, storing data, and/or executing instructions. The controller 115 of the illustrated embodiment implements one or more methods for controlling operation of the boost converter 108. However, the methods described herein may alternatively be practice with systems and boost converters other than the system 100 and boost converter 108 described above.

One exemplary method includes receiving a desired current. In the illustrated embodiment, the desired current is the current to be drawn from the fuel cell 104 at the input 110 of the boost converter 108. Also, in the illustrated embodiment, the desired current is received by the controller 115 from a vehicle computer (not shown) which determines how much current is necessary based on the operation or desired operation the loads 130. In another embodiment, the desired current is calculated internally by the controller 115.

The method also includes determining which of the paths 216a, 216b, 216c to utilize. That is, the method includes determining which of the paths 216a, 216b, 216c will be implemented in providing power from the input 110 to the output 112 of the boost converter 108. In the illustrated embodiment, the method includes determining which of the first, second, and third paths 216a, 216b, 216c will be utilized to supply power to the distribution bus 128 via the output 112 of the boost converter 108.

One step in determining which of the paths 216a, 216b, 216c to utilize is determining whether each of the paths 216a, 216b, 216c is available or unavailable. To determine whether a path 216a, 216b, 216c is available, the controller 115 receives inputs regarding faults on each path 216a, 216b, 216c. For examples, in the illustrated embodiments, the IGBTs 222a, 222b, 222c may send a de-saturation fault signal to the controller 115. In response to receiving a fault signal, the controller 115 may exclude use of a path 216a, 216b, 216c. Furthermore, the controller 115 may perform other internal calculations to determine whether one or more of the paths 216a, 216b, 216c are faulted. As a result of these calculations, the controller 115 may exclude use of the one or more faulted paths 216a, 216b, 216c. That is, the controller 115 may mark the faulted paths 216a, 216b, 216c as "unavailable" and refrain from their use.

Yet another step in determining which of the paths 216a, 216b, 216c to utilize involves ranking the "health" of each paths 216a, 216b, 216c. The health of each path 216a, 216b, 216c may be based on one or more factors, i.e., health factors. One health factor may be the temperature of electrical and/or electronic components (not separately numbered) along the path 216a, 216b, 216c. Typically, the higher a temperature of such electrical and/or electronic components along the path 216a, 216b, 216c indicates a less desirable path, as excessive temperature can reduce current flow and may result in damage to the components. Of course, other health factors may be utilized in determining the health of a path 216a, 216b, 216c, besides the temperature of electrical and/or electronic components.

In the illustrated embodiment, the factors for ranking the health of each path 216a, 216b, 216c include the temperatures of the inductors 218a, 218b, 218c, the IGBTs 222a, 222b, 222c, and the diodes 223a, 223b, 223c disposed along the respective path 216a, 216b, 216c. Specifically, in the illustrated embodiment, the path 216a, 216b, 216c having the highest temperature of an inductor 218a, 218b, 218c, an IGBT 222a, 222b, 222c, or a diode 223a, 223b, 223c is categorized as the worst path 216a, 216b, 216c, and thus least desirable for conducting electrical power. The next highest temperature on a different path 216a, 216b, 216c is categorized as the second worst path, and so on.

In another embodiment, the method includes sensing the temperature of each of the IGBTs 222a, 222b, 222c and then ranking the paths 216a, 216b, 216c that have the lowest temperatures of the IGBTs 222a, 222b, 222c to be utilized. In yet another embodiment, the method includes sensing the temperature of each of the inductors 218a, 218b, 218c and then ranking the paths 216a, 216b, 216c that have the lowest temperatures of the inductors 218a, 218b, 218c to be utilized. In yet another embodiment, the method includes sensing the temperatures of each of the IGBTs 222a, 222b, 222c and each of the inductors 218a, 218b, 218c, finding the average temperatures of the IGBTs 222a, 222b, 222c and the inductors 218a, 218b, 218c along each path 216a, 216b, 216c, and then ranking the paths 216a, 216b, 216c that have the lowest average temperatures to be utilized. Specifically, the path 222a, 222b, 222c having the lowest average temperature of the inductor 218a, 218b, 218c and the IGBT 222a, 222b, 222c would be ranked as most desirable for conducting electrical power, the path 222a, 222b, 222c having the second lowest average temperature would be ranked as the second most desirable, and the path 222a, 222b, 222c having with the highest average temperature would be ranked as least desirable for conducting electrical power.

When the health of each path 216a, 216b, 216c is identical or substantially similar, the ranking of the paths 216a, 216b, 216c for conducting electrical power is based on the amount of use that each path 216a, 216b, 216c has historically endured. Specifically, in the illustrated embodiment, when each path 216a, 216b, 216c is utilized to supply power therethrough, the controller 115 records the amount of time that each path 216a, 216b, 216c is utilized. The path 216a, 216b, 216c with the lowest operation time is ranked as the most desirable for conducting electrical power, the path 216a, 216b, 216c with the second lowest operation time is ranked as the second most desirable, while the path 216a, 216b, 216c having the highest operation time is ranked as the least desirable.

Yet another step in determining which of the paths 216a, 216b, 216c to utilize is determining how many of the paths 216a, 216b, 216c need to be utilized based on the received desired current. Said another way, a minimum number of paths 216a, 216b, 216c necessary to draw the desired current must be determined. In the illustrated embodiment, the software program running on the controller 115 determines if one, two, or all three of the paths 216a, 216b, 216c are necessary to draw the desired current from the input 110 of the boost converter 108.

For example, the software may include a first predetermined threshold value and a second predetermined threshold value, with the second predetermined threshold being greater than the first predetermined threshold value. If the desired current is lower than the first predetermined threshold value, then only one of the paths 216a, 216b, 216c need to be utilized. If the desired current is greater than the first predetermined threshold value, but lower than the second predetermined threshold value, then two of the paths 216a, 216b, 216c need to be utilized. Finally, if the desired current is greater than the second predetermined threshold value, then all three of the paths 216a, 216b, 216c need to be utilized.

By utilizing only the number of paths 216a, 216b, 216c actually necessary to draw the desired current, the boost converter 108 of the disclosed system 100 achieves greater efficiency than conventional boost converters, where each path is always in operation. Furthermore, if the desired current is greater than the current that available to be received by the boost converter 108, due to faulted paths 216a, 216b, 216c, etc., then the controller 115 initiates a warning message. The warning message may be delivered to the driver of the vehicle 102 and/or sent to the vehicle computer.

Furthermore, another step in determining which of the paths 216a, 216b, 216c to utilize is selecting the paths 216a, 216b, 216c based on how many of the paths need to be utilized in combination with the ranking of the health of each path 216a, 216b, 216c as described above. For example, if it is determined that two paths 216a, 216b, 216c need to be utilized and the ranking of the paths 216a, 216b, 216c from highest to lowest is the second path 216b, the third path 216c, and the first path 216a, then the second and third paths 216b, 216c will be selected to be utilized to conduct the electrical power through the boost converter 108.

Figure 3:
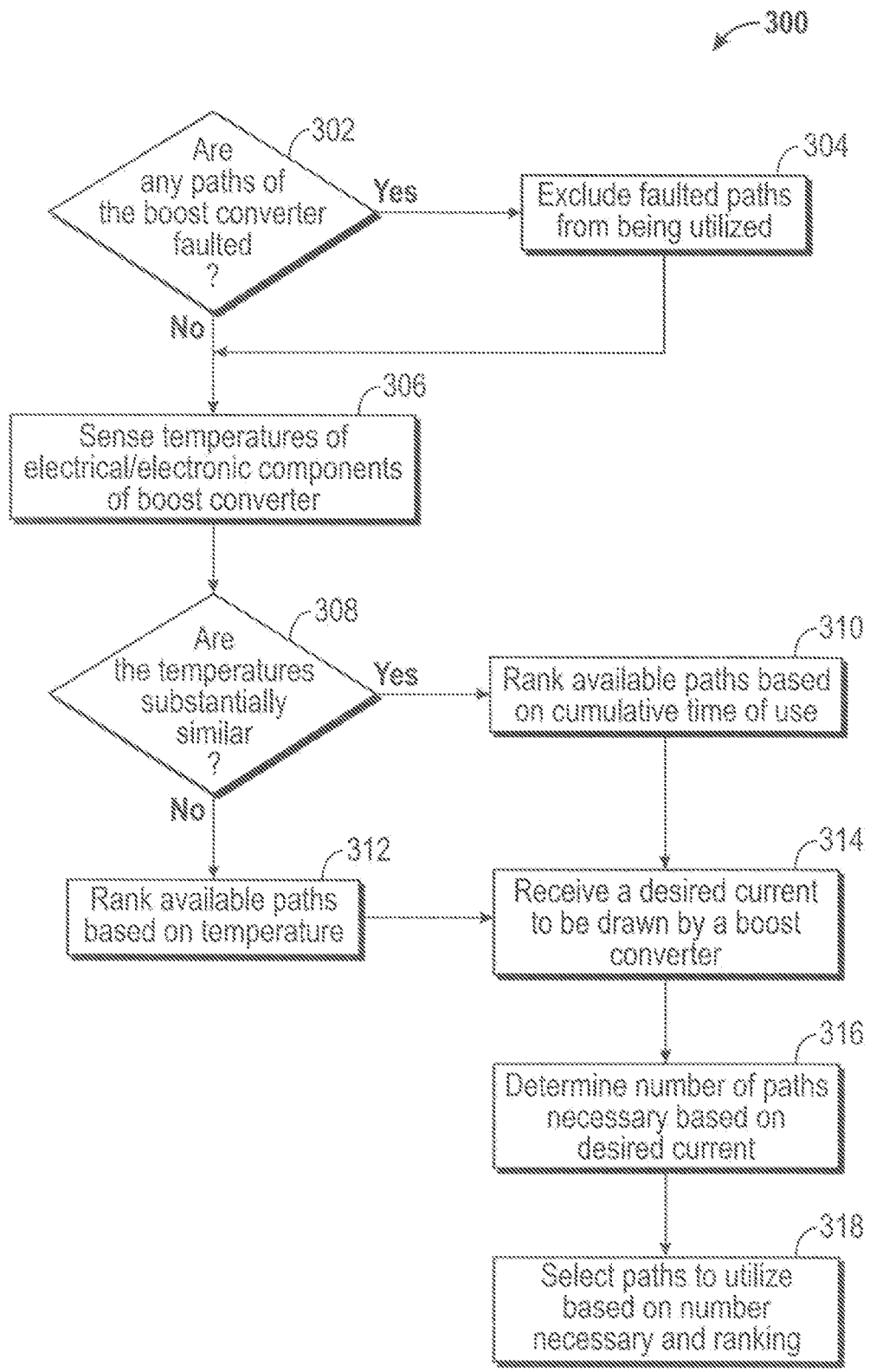
FIG. 3 is a flowchart showing one exemplary method of determining which of the paths of the boost converter to utilize.

A flowchart showing an exemplary method 300 can be seen with reference to FIG. 3. Specifically, the method 300 includes the step 302 of determining if any of the paths 216a, 216b, 216c of the boost converter 108 are faulted. If any of the paths 216a, 216b, 216c are faulted, then the method proceeds to the step 304 of excluding faulted paths 216a, 216b, 216c from being utilized. After step 304, or if none of the paths 216a, 216b, 216c are faulted, the method 300 proceeds with the step 306 of sensing temperatures of electrical/electronic components of the boost converter 108.

The method 300 then includes the step 308 of determining if any of the temperatures sensed in step 306 are substantially similar. If the temperatures are substantially similar, then the method 300 includes the step 310 of ranking the available paths 216a, 216b, 216c based on cumulative time of use. If the temperatures sensed in step 306 are not substantially similar, then the method 300 includes the step 312 of ranking the available paths 216a, 216b, 216c based on temperature.

After steps 310 or 312, the method 300 further includes the step 314 of receiving a desired current to be drawn by the boost converter 108. Next, the method 300 includes the step 316 of determining the number of paths 216a, 216b, 216c necessary based on the desired current. The method 300 then includes the step 318 of selecting the paths 216a, 216b, 216c to utilize based on number necessary and ranking (from steps 310 or 312).

The method of the disclosure also includes controlling the switches 220a, 220b, 220c to regulate the flow of current through the paths 216a, 216b, 216c. The switches 220a, 220b, 220c corresponding with the selected paths 216a, 216b, 216c to be utilized, as described above, alternate between an "on" state and an "off" state. Thus, "on" pulses (not labeled) are created for the controlled switches 220a, 220b, 220c. More specifically, in the illustrated embodiment, the switching period, i.e., the time between one "on" state to the next "on" state, is about 60 μs. The switches 220a, 220b, 220c corresponding to the paths 216a, 216b, 216c that are not selected to be utilized simply remain in the "off" state, thus preventing current flow through the respective path 216a, 216b, 216c.

Figure 4:
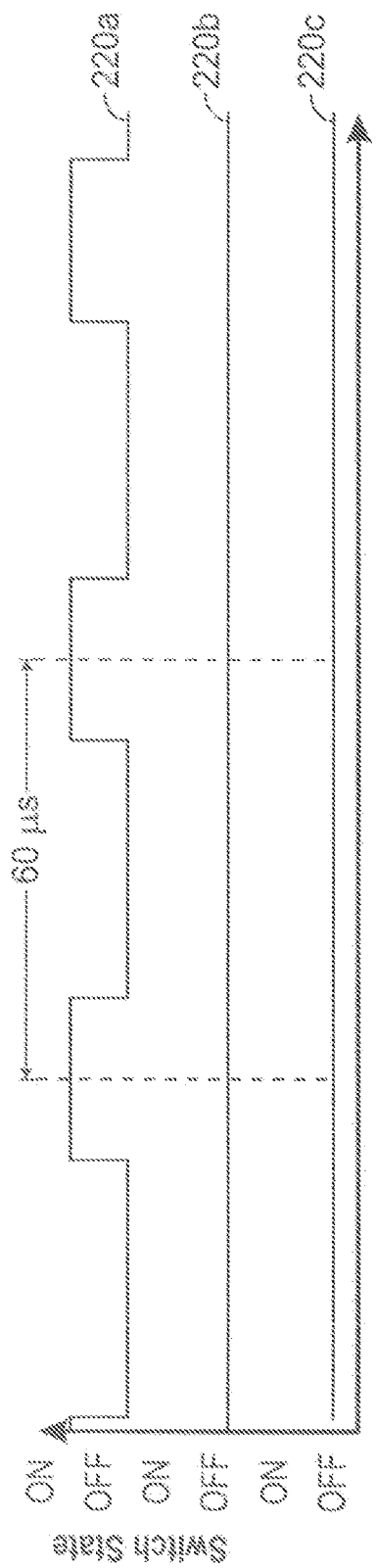
FIG. 4 is a timing diagram showing operation of switches of the boost converter in one path operation.

The timing of the control of the switches 220a, 220b, 220c is based at least in part on the determination of how many of the paths 216a, 216b, 216c to utilize. In single path operation, i.e., when only one path, e.g., the first path 216a, is selected to be utilized, then the associated first switch 220a alternates between "off" and "on", such that current flows through the first path 216a to the output 128. Accordingly, the second and third switches 216b, 216c are turned "off", such that current does not flow through the second and third paths 216b, 216c to the output 112. FIG. 4 shows the on and off switching, or pulsing, of the first switch 220a.

Figure 5:
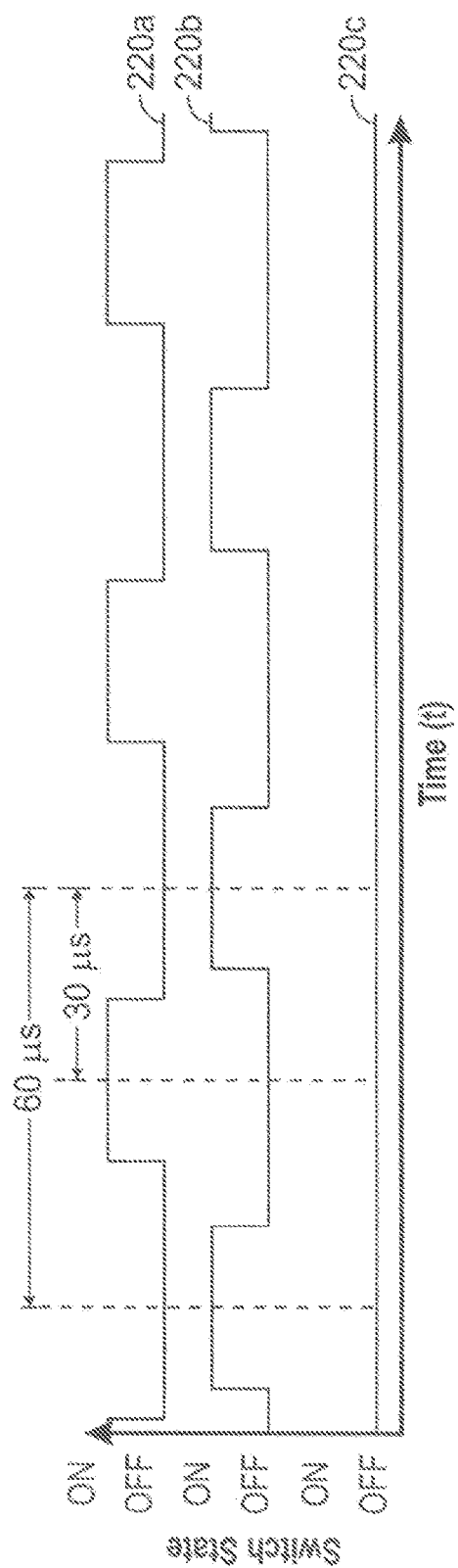
FIG. 5 is a timing diagram showing operation of the switches of the boost converter in two path operation.

In two-path operation, i.e., when two paths are selected to be utilized, then two switches are switched between the "off" state and the "on" state. FIG. 5 illustrates one example where the first and second paths 216a, 216b are selected to be utilized, and accordingly, the first and second switches 220a, 220b, are switched between the "off" state and the "on" state. The timing of operation of the switches 220a, 220b is phase shifted by 180°. The term "phase shift" refers to a delay between the operational timing of switches. As shown in FIG. 5, a center of the "on" pulse of the first switch 220a is 30 μs offset from a center of the "on" pulse of the second switch 220b. In this example, the third switch 220c remains in the "off" state.

Figure 6:
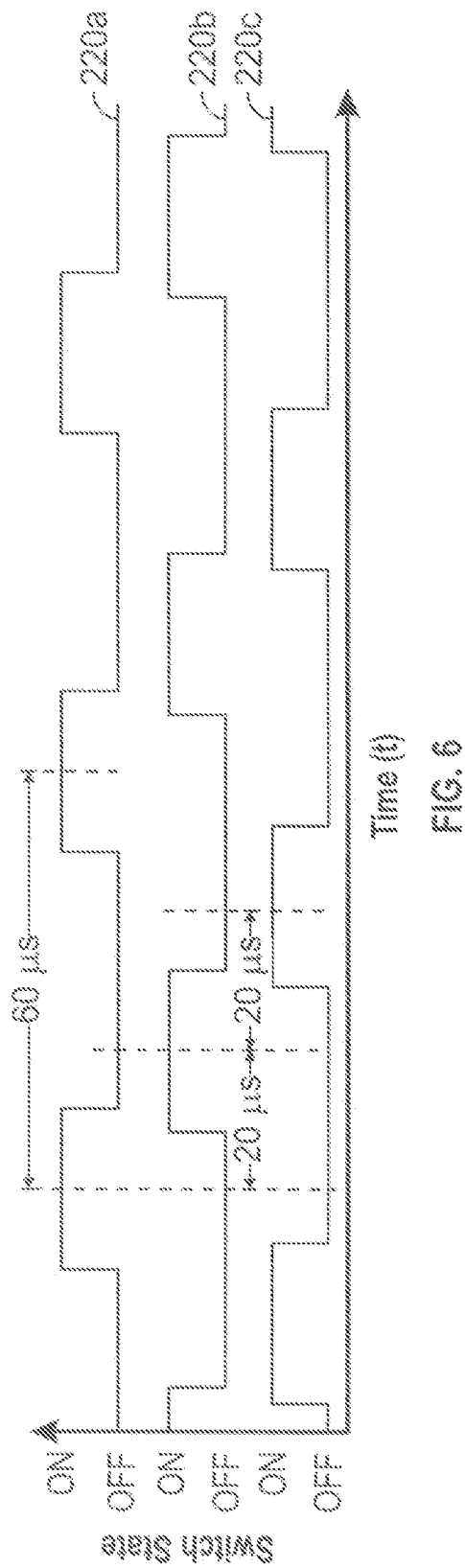
FIG. 6 is a timing diagram showing operation of the switches of the boost converter in three path operation.

In three-path operation, i.e., when all three paths 216a, 216b, 216c are selected to be utilized, then all three switches 216a, 216b, 216c are alternately switched between the "off" state and the "on" state, as shown in FIG. 6. The timing of operation of the switches 216a, 216b, 216c are phase shifted by 120°. As shown in FIG. 6, a center of the "on" pulse of the first switch 220a occurs 20 μs prior to a center of the "on" pulse of the second switch 220b. Likewise, a center of the "on" pulse of the second switch 220b occurs 20 μs prior to a center of the "on" pulse of the third switch 220c.

During normal operation of the vehicle 102, the desired current will change based on performance demands of the various loads 130. As such, the number of paths 216a, 216b, 216c that are necessary to deliver the current to the various loads 130 will change. Furthermore, the temperatures of electronic components in the boost converter 108 will also fluctuate. In response to the above factors, the controller 115 constantly monitors these factors and routinely initiates a "reorganization" of the paths 216a, 216b, 216c when such factor cross certain threshold levels.

Particularly, when shifting from three-path operation to two-path operation, the phase shifts of the remaining paths 216a, 216b, 216c are not instantaneously changed from the 120° phase shift of three-path operation to the 180° phase shift of two-path operation. Instead, the phase shift, i.e., the operational delay of the switches 220a, 220b, 220c, is slowly incremented over several on-off cycles. This incremental change in phase shift minimizes the dynamic impact to the system 100. Moreover, this incremental change in phase shift minimizes input current ripple, which in turn, reduces stress on the upper-level fuel cell stack of the fuel cell 104. Specifically, the phase shift of 180° when two paths 216a, 216b, 216c are selected and the phase shift of 120° when three paths 216a, 216b, 216c are selected both minimize input current ripple, even in steady state.

By incremental shifting of the phases, the amplitude of the current changes gradually as well. Specifically, when reducing the number of paths 216a, 216b, 216c used, the current of the path 216a, 216b, 216c that is being turned "off" will reduce gradually and the current of the other path(s) 216a, 216b, 216c changes accordingly to maintain the total output current.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling operation of a boost converter using a controller, the boost converter having an input, an output, a plurality of paths electrically connecting the input to the output, and a plurality of switches disposed along the paths to control current flow between the input and the output, said method comprising:
    receiving a desired current at the controller;
    ranking the plurality of paths based at least partially on a health factor of each one of the plurality of paths, wherein the ranking of the plurality of paths comprises:
        measuring respective temperatures pertaining to each of the plurality of paths;
        determining whether the respective temperatures of the plurality of paths are substantially similar to one another;
        ranking the plurality of paths based on cumulative time of use, if the respective temperatures are substantially similar to one another; and
        ranking the plurality of paths instead based on the respective temperatures, if the respective temperatures are not substantially similar to one another;
    determining which of the plurality of paths to utilize based at least in part on the desired current and the ranking of the plurality of paths; and
    controlling the plurality of switches with the controller based at least in part on the determination of which of the plurality of paths to utilize.

2. The method as set forth in claim 1 wherein determining which of the plurality of paths to utilize comprises determining how many of the plurality of paths to utilize based on the received desired current.

3. The method as set forth in claim 1 wherein ranking the plurality of paths comprises:
    sensing the temperature of each of the plurality of switches; and
    assigning the path that has a highest switch temperature as the least desirable to be utilized.

4. The method as set forth in claim 1 wherein each of the plurality of paths includes an inductor and ranking the plurality of paths comprises sensing the temperature of each of the inductors.

5. The method as set forth in claim 4 wherein ranking the plurality of paths comprises assigning the path that has a highest inductor temperature as the least desirable to be utilized.

6. The method as set forth in claim 4 wherein ranking the plurality of paths comprises:
   sensing the temperature of each of the plurality of switches; and
   assigning the path that has a highest temperature of switch or inductor as the least desirable to be utilized.

7. The method as set forth in claim 6 wherein determining which of the plurality of paths to utilize comprises determining whether each of the plurality of paths is available or unavailable.

8. The method as set forth in claim 7 wherein determining which of the plurality of paths to utilize comprises excluding use of one of the plurality of paths in response to the one of the plurality of paths being unavailable.

9. The method as set forth in claim 1 wherein determining which of the plurality of paths to utilize comprises determining whether each of the paths is available or unavailable.

10. The method as set forth in claim 9 wherein determining which of the plurality of paths to utilize comprises excluding use of one of the plurality of paths in response to the one of the plurality of paths being unavailable.

11. The method as set forth in claim 1 wherein ranking the plurality of paths comprises:
    recording an amount of operation time that each of the plurality of paths is utilized; and
    ranking one of the plurality of paths that has a lowest operation time as the most desirable to be utilized when the health factor of each path is substantially similar.

12. The method as set forth in claim 1 wherein controlling the plurality of switches comprises alternating at least one of the switches between an "on" state and an "off" state.

13. The method as set forth in claim 12 further comprising shifting a timing of operation of at least one of the switches between the "on" state and the "off" state.

14. The method of claim 2, wherein the step of controlling the plurality of switches comprises:
    when three of the plurality of paths are utilized based on temperature conditions, switching three of the plurality of switches between an off state and an on state using three switch control with a one hundred twenty degree phase shift;
    when two of the plurality of paths are utilized based on the temperature conditions, switching two of the plurality of switches between an off state and an on state using two switch control with a one hundred eighty degree phase shift; and
    when the number of paths to be utilized is to be changed from three paths to two paths based on changes in the temperature conditions, then shifting between the three switch control to the two switch control by gradually implementing an incremental change in phase shift via an incremental change in an operational delay of one or more of the plurality of switches over several on-off cycles.

15. A system comprising:
    a boost converter including
      an input,
      an output,
      a plurality of paths electrically connecting said input to said output, and
      a plurality of switches disposed along said paths to control current flow between said input and said output;
    a plurality of temperature sensors configured to measure respective temperatures pertaining to each of the plurality of paths; and
    a controller for receiving a desired current to be supplied, ranking said plurality of paths based on a health factor of each one of said plurality of paths, determining which of said plurality of paths to utilize based at least in part on the desired current and the ranking of said plurality of paths, and controlling said plurality of switches based at least in part on the determination of which of said plurality of paths to utilize;
    wherein the controller is configured to rank the plurality of paths by:
      determining whether the respective temperatures of the plurality of paths are substantially similar to one another;
      ranking the plurality of paths based on cumulative time of use, if the respective temperatures are substantially similar to one another; and
      ranking the plurality of paths instead based on the respective temperatures, if the respective temperatures are not substantially similar to one another.

16. The system as set forth in claim 15 wherein said controller determines how many of said plurality of paths to utilize based on the received desired current.

17. The system as set forth in claim 15 further comprising a plurality of inductors with at least one inductor disposed in each of said plurality of paths.

18. The system as set forth in claim 17 wherein the plurality of temperature sensors sense the temperatures of said plurality of switches and said plurality of inductors, wherein said controller analyzes the temperatures of said plurality switches and said plurality inductors and ranks one of said plurality of paths having a lowest average temperature of said plurality of switches and said plurality of inductors as the most desirable to be utilized.

19. The system as set forth in claim 15 wherein said controller records an amount of operation time that each of said plurality of paths is utilized and ranks one of said plurality of paths that has a lowest operation time as the most desirable to be utilized.

20. The system of claim 16, wherein the controller is configured to at least facilitate:
    when three of the plurality of paths are utilized based on temperature conditions, switching three of the plurality of switches between an off state and an on state using three switch control with a one hundred twenty degree phase shift;
    when two of the plurality of paths are utilized based on the temperature conditions, switching two of the plurality of switches between an off state and an on state using two switch control with a one hundred eighty degree phase shift; and
    when the number of paths to be utilized is to be changed from three paths to two paths based on changes in the temperature conditions, then shifting between the three switch control to the two switch control by gradually implementing an incremental change in phase shift via an incremental change in an operational delay of one or more of the plurality of switches over several on-off cycles.

* * * * *